United States Patent [19]

Setina

[11] Patent Number: 4,595,227
[45] Date of Patent: Jun. 17, 1986

[54] MOTOR VEHICLE PARTITION APPARATUS WITH LONGITUDINALLY OFFSET SECTIONS

[76] Inventor: John R. Setina, 2926 Yelm Hwy. SE., Olympia, Wash. 98501

[21] Appl. No.: 559,947

[22] Filed: Dec. 9, 1983

[51] Int. Cl.$^4$ .......................................... B62D 33/04
[52] U.S. Cl. ................................................ 296/24 R
[58] Field of Search ..................................... 296/24 R

[56] References Cited

U.S. PATENT DOCUMENTS

| | | | |
|---|---|---|---|
| Re. 27,942 | 3/1974 | Setina | 296/24 R |
| 1,611,248 | 12/1926 | Smith et al. | 296/24 R |
| 2,495,520 | 1/1950 | Grimm | 296/65 |
| 2,566,032 | 8/1951 | Poland | 296/24 R |
| 3,214,211 | 10/1965 | Setina | 296/24 |
| 3,423,121 | 1/1969 | Lipkin | 296/24 |
| 3,441,309 | 4/1969 | Halstead et al. | 296/24 |
| 3,547,217 | 12/1970 | Garza | 180/112 |
| 3,549,195 | 12/1970 | Kallinikos | 296/24 |
| 3,632,155 | 1/1972 | Parker | 296/24 |
| 3,666,313 | 5/1972 | Halstead et al. | 296/24 |
| 3,667,801 | 6/1972 | Setina | 296/23 |
| 4,015,875 | 4/1977 | Setina | 296/24 |
| 4,035,014 | 7/1977 | Sellers | 296/24 |
| 4,173,369 | 11/1979 | Roggin | 296/24 |

Primary Examiner—Robert B. Reeves
Assistant Examiner—Russell D. Stormer
Attorney, Agent, or Firm—Klarquist, Sparkman, Campbell, Leigh & Whinston

[57] ABSTRACT

A motor vehicle partition apparatus is disclosed suitable for use in a motor vehicle such as a two door automobile. The partition apparatus includes three longitudinally offset sections—a forward section, a rearward and an intermediate section therebetween. The forward partition section is mounted in the position normally occupied by the front passenger seat which is removed. The rearward partition section is mounted behind the driver's seat spaced horizontally and rearwardly of the forward section along the longitudinal axis of the automobile by a longitudinal offset space. The intermediate partition section is connected between the forward section and the rearward section diagonally across the longitudinal offset space. A vertical sliding window is provided in the intermediate partition section and fixed windows are mounted in the forward and rearward partition sections. As a result, a partition apparatus having a generally Z-shaped horizontal cross-section is provided. The partition apparatus is mounted to a support bar frame having two leg portions attached to the floor of the automobile, and includes a roll bar portion which extends from the top portion of the support bar frame to a third leg anchored to the floor of the automobile to provide an opening between the first and third legs which permits entry and exit of a passenger from the rear seat of the automobile.

20 Claims, 5 Drawing Figures

MOTOR VEHICLE PARTITION APPARATUS WITH LONGITUDINALLY OFFSET SECTIONS

BACKGROUND OF THE INVENTION

The present invention relates to motor vehicle partition apparatus such as are used in police cars, taxi cabs and other automobiles to separate passengers in the rear seat of the automobile from the driver. The motor vehicle partition apparatus of the present invention is especially useful in a two door automobile to enable passenger entry to and exit from the rear seat of the automobile through the passenger door while protecting the driver from passengers in such rear seat.

It has been previously proposed in my U.S. Pat. No. 3,667,801 issued June 6, 1972 and U.S. Pat. No. 4,015,875 issued Apr. 5, 1977 of J. R. Setina to provide an automobile partition apparatus having a horizontal or vertical sliding window and mounted on a roll bar positioned within an automobile. However, these previous automobile partitions have only been suitable for use in a four door automobile positioned behind the front seat backrest of such automobile so that the partition sections are in lateral alignment with each other at the same longitudinal position along the longitudinal axis of the automobile. These prior automobile partitions are unsuitable for use in two door automobiles even though such automobiles are more maneuverable and less expensive to purchase and operate so they are frequently more desirable for use as police cars than four door automobiles.

It has also been previously known to use an automobile partition in a four door taxi cab to protect the driver from passengers in the rear seat or the front seat, as shown in U.S. Pat. No. 3,549,195 of Kallinikos issued Dec. 22, 1970. However, this partition apparatus is not suitable for use in a two door automobile and is not provided with a forward partition section at the normal position of the front passenger seat, such forward section being longitudinally offset from a rearward partition section positioned behind the driver seat in the manner of the present invention. U.S. Pat. No. 2,495,520 of Grimm shows another four door taxi cab partition with a swingable front passenger seat to enable access to the rear seats from such front seat. However, there is no forward partition section which extends across the normal position of the front passenger seat and is longitudinally offset from a rearward partition section behind the driver seat in the manner of the present invention.

U.S. Pat. No. 3,423,121 of Lipkin issued Jan. 21, 1969 shows a protective partition used in airplanes or trains to protect passengers against deceleration encountered upon stopping. However, this partition is not suitable for use in a two door automobile because it does not have a forward partition section in the normal position of the front passenger seat and which is longitudinally offset from a rearward section positioned behind the drivers seat of the automobile. Instead, the protective partition of this patent is designed to be positioned entirely in front of the passenger seat of an airplane or train to keep the passenger from being thrown forward during deceleration of the airplane or train such as on braking, or in a crash landing situation.

SUMMARY OF INVENTION

It is therefore one object of the present invention to provide an improved motor vehicle partition which enables access to the rear seat of the vehicle through the front passenger door and behind such partition while protecting the driver from any passengers in the rear seat of the vehicle.

Another object of the invention is to provide such a partition apparatus including longitudinally spaced partition sections which is suitable for use in a two door automobile.

A further object of the invention is to provide such a partition apparatus of simple and inexpensive construction which includes a support bar frame around the partition sections to provide great strength for protection of the driver of the vehicle.

An additional object of the invention is to provide an improved automobile partition apparatus including a forward partition section adapted to be mounted in the position normally occupied by the front passenger seat, and a rearward partition section longitudinally offset with respect to such forward section and adapted to be mounted behind the driver seat, such forward and rearward sections being joined by an intermediate section which extends across the offset space between such front and rear sections while providing the emergency exit space between the forward section and the front edge of the passenger door opening for escape when the driver's door is blocked.

Still another object of the invention is to provide such a partition apparatus in which a support bar frame is provided to support the partition sections including a top support bar portion and a pair of first and second legs at the outer sides of the partition adapted to be attached to the floor of the automobile and the roll bar portion is connected between the top support bar and a third leg which is spaced rearwardly from the first leg on the same side of the vehicle to enable entry and exit from the rear seat through the space between such first and third legs.

A still further object of the invention is to provide such a partition apparatus having a vertical sliding window in the intermediate partition section held in a raised position by a releasable lock and which may also be provided with fixed windows in the forward and rearward partition sections for greater visability, improved ventilation and for better communication with the driver.

DESCRIPTION OF DRAWINGS

Other objects and advantages of the present invention will be apparent from the following description of a preferred embodiment thereof and from the attached drawings of which.

DESCRIPTION OF PREFERRED EMBODIMENT

Figure 2:
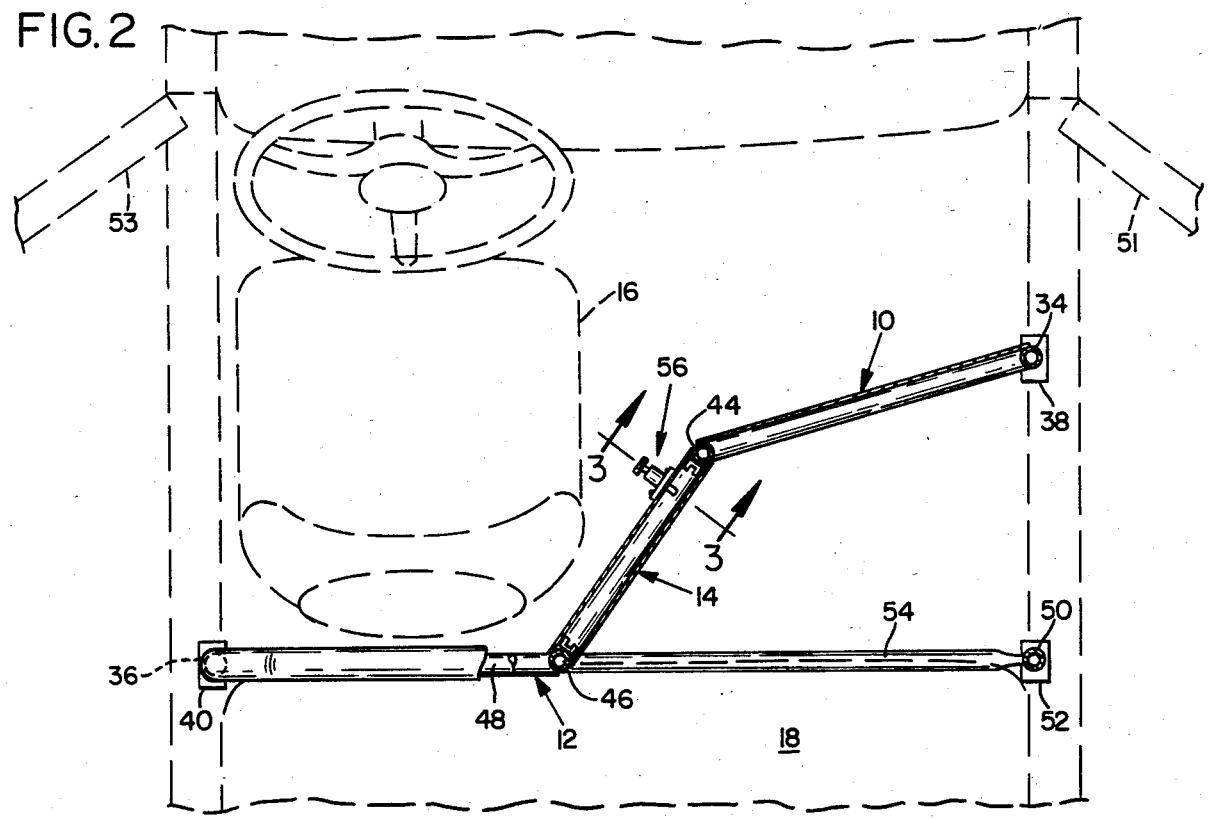
FIG. 2 is an enlarged plan view of the partition apparatus of FIG. 1 with parts broken away for clarity and showing in dashed lines an automobile in which such partition apparatus is mounted.
Figure 1:
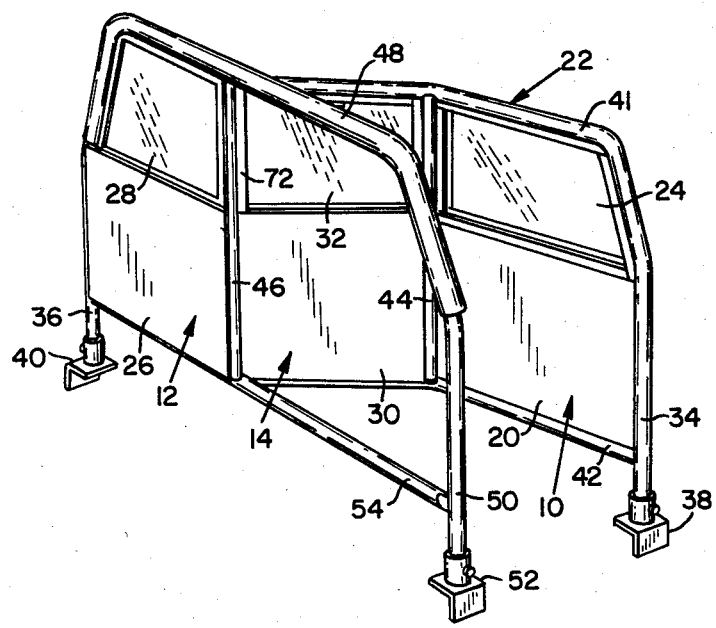
FIG. 1 is an oblique elevation view of one embodiment of the motor vehicle partition apparatus of the present invention.

As shown in FIGS. 1 and 2 the motor vehicle partition apparatus of the present invention includes a forward partition section 10, a rearward partition section 12 longitudinally offset from said forward partition in a direction rearwardly along the longitudinal axis of a two door automobile in which the partition is mounted. An intermediate partition section 14 is connected between the laterally offset inner edges of the forward section 10 and the rearward section 12 to extend diagonally across the longitudinal offset space between such forward and rearward sections. The intermediate section 14 intersects the forward section 10 and rearward section 12 at obtuse angles. Thus, the partition apparatus is of a general Z-shaped horizontal cross-section.

The partition apparatus is mounted in a two door automobile with the forward section 10 positioned where the removed front passenger seat is normally located and with the rearward section positioned behind the driver seat 16. As a result, the driver of the automobile siting in the driver seat 16 is separated from passengers in the rear seat 18 of the automobile by the partition to prevent such passengers from attacking the driver, such as when the automobile is a police car used to transport criminals.

The forward partition section 10 includes a lower metal panel 20 of steel which is secured to a partition frame formed by hollow support bar 22 of steel. The forward partition section 10 also includes a fixed window portion 24 of clear plastic or unbreakable glass which fills the space between the lower metal panel 20 and the top of the support bar frame 22. Similarly, the rearward partition section 12 is provided with a lower metal panel 26 and a fixed window portion 28 mounted above such lower panel, both of which are attached to the support bar frame 22, such as by welding or bolting. The intermediate partition section 14 is also provided with a lower metal panel 30 and a window 32 which may be a vertical sliding window hereafter described.

The support bar frame 22 includes a pair of first and second legs 34 and 36 which extend along the outer edges of the forward partition section 10 and the rearward partition section 12, respectively, and are fixedly attached to the floor of the automobile by anchors 38 and 40, respectively, bolted to the floor. The support bar frame 22 also includes a top bar portion 41 extending along the top of the partition between the ends of the two leg portions 34 and 36, such top bar portion being attached to the top edges of the forward, rearward and intermediate partition sections 10, 12 and 14. In addition, the support bar frame 22 includes a bottom bar portion 42 which extends along the bottom of the partition between the bottom ends of the pair of legs 34 and 36, such bottom bar portion being attached to the bottom edges of the forward, rearward and intermediate partition sections 10, 12 and 14. In addition, the support bar frame 22 includes a pair of vertical support posts 44 and 46 which extend between the bottom bar 42 and the top bar 41 on the opposite sides of the intermediate partition section 14 so that the opposite side edges of the lower metal panel 20 are attached to such support posts, as are the inner edges of the lower panels 20 and 26.

A roll bar is provided to support the roof of the automobile in case it rolls over. The roll bar includes a roll bar portion 48 welded to the top bar portion 41 of the support bar frame 22 at its junction with the support post 46. The roll bar portion 48 extends to the top of a third leg 50 which is attached to the floor of the automobile by an anchor 52 at a position spaced rearwardly from the first leg 34. As a result, an opening is provided between the first and third legs to enable entry and exit of a passenger from the rear seat of the automobile through the front passenger door 51. It should be noted that the longitudinal offset space between the forward section 10 and the rearward section 12 is less than the longitudinal distance from such rearward section to the front of the driver's seat 16. Thus, when the driver seat door 53 is blocked, the driver may exit the automobile through the passenger door 51 by passing in front of the forward partition section 10 and through an emergency exit space between the first leg 34 and the front edge of the passenger door opening at the windshield.

A bottom reinforcing bar 54 is connected between the bottom ends of the second and third legs 36 and 50, and to the bottom of the support post 46. The reinforcing bar 54 extends beneath the front lip of the rear seat cushion of the rear seat 18. Each of the legs 34, 36 and 50 may be mounted on leg anchors 38, 40 and 52 in any suitable manner such as that shown in my earlier U.S. Pat. No. 3,667,801 of Setina issued June 6, 1972.

Figure 3:
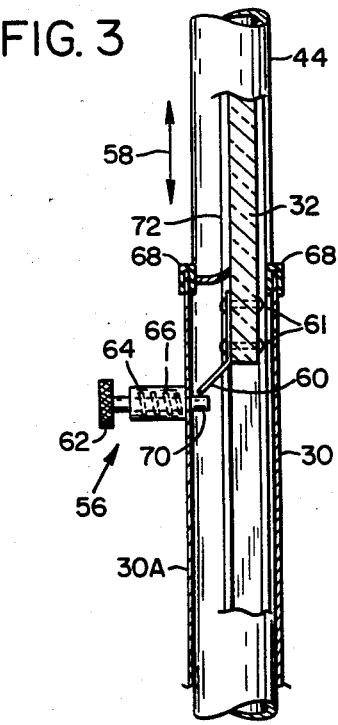
FIG. 3 is an enlarged section view taken along the lines 3—3 of FIG. 2.
Figure 4:
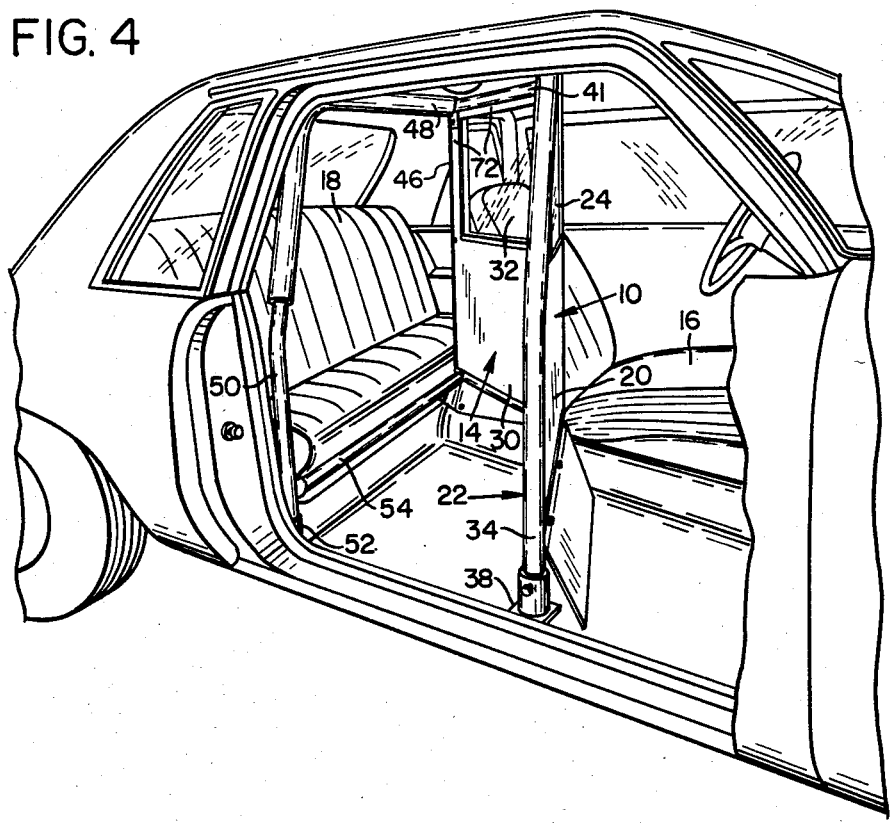
FIG. 4 is an elevation view with the passenger door broken away for clarity of the right side of a two door automobile having the partition apparatus of FIGS. 1 to 3 mounted therein.
Figure 5:
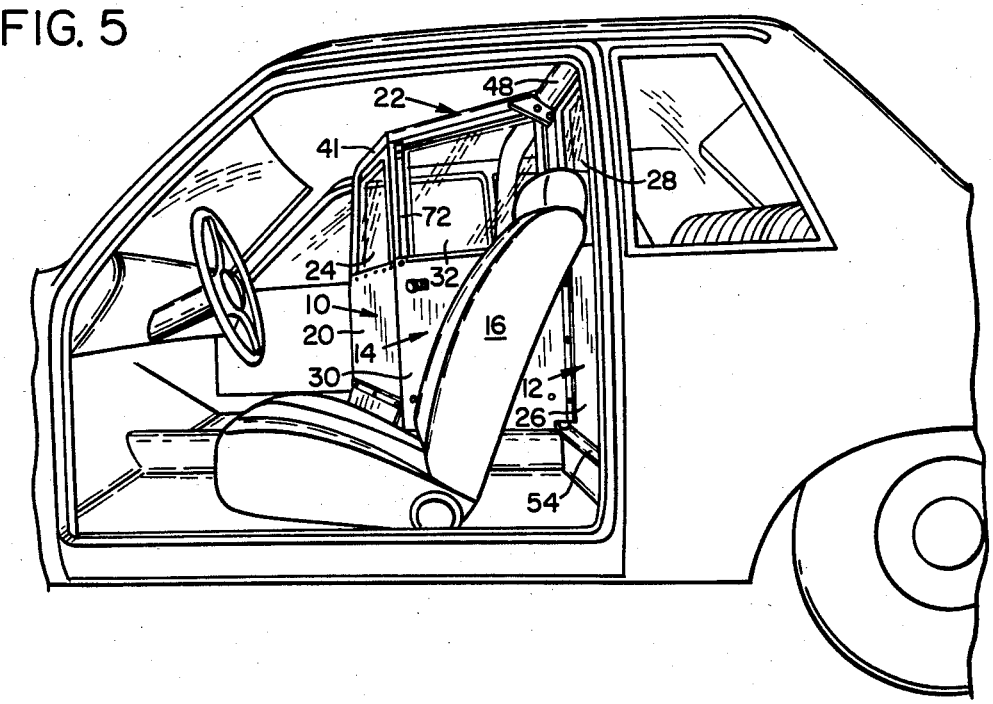
FIG. 5 is an elevation view with the driver door broken away for clarity of the left side of the automobile of FIG. 4.

As shown in FIG. 3, the vertical sliding window 32 is provided with a releasable lock means 56 for locking such window in the raised position and for allowing the window to be lowered to a down position by releasing the lock means. Thus, the window 32 is mounted for vertical sliding movement in the direction of arrows 58 in a channel space formed between the back panel 30 and the front panel 30A of the intermediate partition section 14. A latch plate 60 is bolted to the bottom end of the window 32 by bolts 61, such latch plate having a bottom end extending at an angle of approximately 45° with respect to the plane of the window. The lock means 56 includes a movable latch member 62 in the form of a spring loaded plunger which slides within a cylindrical housing 64 containing a coil spring 66 which resiliently biases such latch member inward to the right in FIG. 3. The housing 64 is bolted to the front side of the front panel 30A at a position adjacent the top edge of the front panel. The top end of both panels 30 and 30A may be covered with a protective strip 68 of flexible plastic or the like to prevent scratching of the window during raising and lowering.

The bottom end of the latch plate 60 engages the inner end 70 of the latch member 62 when the window is fully raised and such latch member is in its normal spring biased locked position shown in FIG. 3. In order to release the lock means 16, the plunger latch member 62 is manually pulled outwardly against the spring pressure by the driver until the end 70 of such latch member clears the latch plate 60, thereby allowing the window 32 to slide downward to a lowered position into the channel formed by panels 30 and 30A. The window 32 is pulled upward manually from its lowered position toward the raised position until the latch plate 60 strikes the end 70 of the plunger latch member 62 which cams it outwardly against the pressure of spring 66 until the latch plate 60 passes above the plunger end 70 at which time the spring urges the plunger inward into the locked position shown in FIG. 3. It should be noted that there is sufficient space between the extended position of end 70 of the plunger latch member and the surface of the window 32 and the window is guided during vertical sliding movement such window does not contact such latch member. To guide a position the sliding window 32, a window frame 72 of extruded aluminum is mounted above the lower panels 30 and 30A as shown in FIG. 3. The window frame encloses the outer edges and the top of the sliding window 32 in the raised position and guides such window so that it is always positioned in the right half of the channel formed between panels 30, 30A during sliding movement of the window. Similarly, other window frames 72 are also provided around the fixed windows 24 and 28 and attached to the tops of the lower panels 26 and 30, respectively. The window frames 72 are all bolted to the partition frame 22 at the top bar portion 41 and at the legs 34 and 36 and posts 44 and 46 as well as to the tops of the lower panels 20, 26 and 30.

It will be obvious to those having ordinary skill in the art that many changes may be made in the details of the preferred embodiment of the invention. For example, other lock means operated by a key and a spring loaded raising mechanism can be employed for the sliding window 32. Therefore, the scope of the invention should be determined by the following claims.

I claim:

1. A motor vehicle partition apparatus, comprising:
   a forward partition section;
   a rearward partition section spaced horizontally of said forward section and spaced rearwardly of said forward section by a longitudinal offset space in a direction longitudinally of the vehicle,
   means for mounting said partition apparatus with the forward partition section in the position where a removed front seat is normally located and the rearward partition section is located behind the driver's seat of the vehicle, said mounting means including first and second legs attached to the outer side edges of the forward and rearward partition sections respectively, and a third leg spaced rearwardly of said first leg by a passenger opening to enable a passenger to enter and exit the rear seat of the vehicle, said longitudinal offset space being less than the longitudinal distance from said rearward partition to the front of the driver's seat to provide an emergency exit space which allows the driver to exit from the driver's seat of the vehicle in front of said forward partition section;
   an intermediate partition section connected between said forward section and said rearward section and extending diagonally across said longitudinal offset space; and
   window means provided in at least one of said partition section.

2. Partition apparatus in accordance with claim 1 in which the rearward section is spaced laterally from said forward section by a lateral offset space in a direction lateral to the vehicle as well as by said longitudinal offset space, and the intermediate partition section extends diagonally across said lateral and longitudinal offset spaces.

3. Partition apparatus in accordance with claim 1 having a general Z-shaped horizontal cross-section.

4. Partition apparatus in accordance with claim 2 in which the intermediate section intersects the forward section and the rearward section at obtuse angles.

5. Partition apparatus in accordance with claim 1 in which the window means includes a sliding window in the intermediate section.

6. Partition apparatus in accordance with claim 5 in which the sliding window is mounted for vertical sliding movement.

7. Partition apparatus in accordance with claim 5 in which the window means also includes a fixed window in each of the forward section and the rear section.

8. Partition apparatus in accordance with claim 1 which also includes a support bar frame means attached to the forward section, the rearward section and the intermediate section.

9. Partition apparatus in accordance with claim 8 in which the support bar frame means includes between the top end of the first leg and the top of the rearward partition section, a top bar extending sections.

10. Partition apparatus in accordance with claim 9 in which the support bar frame means also includes a bottom bar extending between the bottom ends of the pair of legs and attached to bottom edges of the forward, rearward and intermediate partition sections, and includes a pair of support posts extending between the top bar and the bottom bar on opposite sides of the intermediate section and attached to said opposite sides as well as to the inner sides of the forward section and the rearward section.

11. Partition apparatus in accordance with claim 9 in which the top bar is also connected to a roll bar having a third leg spaced rearward from the first leg by a passenger opening to enable passengers to enter and exit the rear seat of the vehicle behind the partition.

12. Partition apparatus in accordance with claim 11 in which the roll bar includes a reinforcing bar extending between the bottom ends of the third leg and the second leg attached to the rearward section and in which a support post is attached between said reinforcing bar and the top bar at the junction of the reinforcing bar with the roll bar, said support post being attached to an inner side edge of the rearward section and to one side edge of the intermediate section.

13. An automobile partition apparatus for a two door automobile, comprising:
    a forward partition section;
    a rearward partition section spaced horizontally of said forward section and rearwardly of said forward section by a longitudinal offset space in a direction longitudinally of the automobile, said longitudinal offset space being less than the longitudinal distance from said rearward partition section to the front of the driver's seat of said automobile;
    an intermediate partition section connected between said forward section and said rearward section and extending diagonally across said longitudinal offset space; and
    means for mounting said partition apparatus in a two door automobile with the forward section in the position normally occupied by a removed front passenger seat and the rearward section behind the driver seat to provide an emergency exit space between the forward section and the front of the passenger door opening to enable the driver to exit from the driver seat through said exit space said mounting means including first and second legs attached to the outer side edges of the forward and rearward partition section respectively, and a third leg spaced rearwardly of said first leg by a passenger opening to enable a passenger to enter and exit the rear seat of the vehicle.

14. Partition apparatus in accordance with claim 13 in which the rearward section is spaced laterally from said forward section by a lateral offset space in a direction lateral to the vehicle, and the intermediate partition section extends across said lateral offset space.

15. Partition apparatus in accordance with claim 14 having a general Z-shaped horizontal cross-section.

16. Partition apparatus in accordance with claim 14 in which the intermediate section intersects the forward section and the rearward section at obtuse angles.

17. Partition apparatus in accordance with claim 13 which includes a sliding window in the intermediate section.

18. Partition apparatus in accordance with claim 13 which also includes a support bar frame means attached to the forward section, the rearward section and the intermediate section.

19. Partition apparatus in accordance with claim 18 in which the support bar frame means includes a top bar extending between the top end of the first leg and the top of the rearward partition section.

20. Partition apparatus in accordance with claim 19 in which the support bar frame means also includes a bottom bar extending between the bottom ends of the pair of legs and attached to bottom edges of the forward, rearward and intermediate partition sections, and includes a pair of support posts extending between the top bar and the bottom bar on opposite sides of the intermediate section and attached to said opposite sides as well as to the inner side edges of the forward section and the rearward section.

* * * * *

UNITED STATES PATENT AND TRADEMARK OFFICE
CERTIFICATE OF CORRECTION

PATENT NO. : 4,595,227
DATED : June 17, 1986
INVENTOR(S) : JOHN R. SETINA

It is certified that error appears in the above-identified patent and that said Letters Patent is hereby corrected as shown below:

Claim 9 should read as follows:

9. Partition apparatus in accordance with claim 8 in which the support bar frame means includes <u>a top bar extending</u> between the top end of the first leg and the top of the rearward partition section. [,a top bar extending sections]

Signed and Sealed this

*Ninth* Day of *September 1986*

[SEAL]

*Attest:*

DONALD J. QUIGG

*Attesting Officer*  *Commissioner of Patents and Trademarks*